July 7, 1931.     E. M. STORY     1,813,099

EDIBLE CONTAINER

Filed July 9, 1929

Inventor
Elliott M. Story
by Knight Brown Quinby Many
Attys.

Patented July 7, 1931

1,813,099

UNITED STATES PATENT OFFICE

ELLIOTT M. STORY, OF WORCESTER, MASSACHUSETTS

EDIBLE CONTAINER

Application filed July 9, 1929. Serial No. 377,017.

This invention relates to an edible container adapted to hold a charge of ice-cream, and be held by a hand of the consumer while the container and charge are being eaten.

The object is to provide a container of novel and attractive form composed of independent sections constituting elements of a so-called ice-cream sandwich, and adapted to completely enclose an annular charge and be confined by digits of a holding hand in such manner as to prevent exudation of the charge material between the sections.

Of the accompanying drawings forming a part of this specification,—

The same reference characters indicate the same parts in all of the figures.

Figure 1:
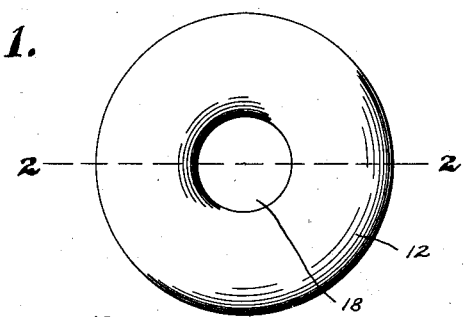
Figure 1 is a side view of a container embodying the invention.

My improved container is composed of two edible sections 12, baked from batter such as is used in making ice-cream cones. The sections have recessed internal faces 13, collectively forming an annular cavity adapted to hold an annular charge 14 of ice-cream, and abutment faces 15, at opposite sides of the recessed faces 13. The external faces of the sections conform to the internal faces 13, and constitute annular inner and outer rests for digits 16 and 17 of a hand holding the container, the arrangement being such that said digits may conveniently press the abutment faces 15 of the two sections together, to prevent exudation of charge material therebetween and exert confining pressure on the sections to prevent relative edgewise displacement of the sections.

Figure 2:
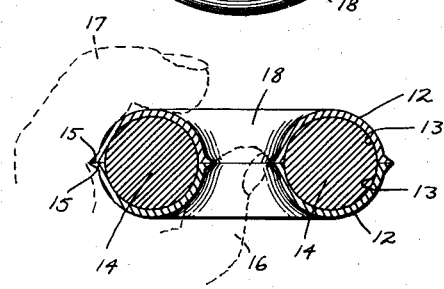
Figure 2 is a section on line 2—2 of Figure 1.
Figure 3:
Figure 3 is a sectional view, showing one of the sections empty.
Figure 4:
Figure 4 is a sectional view showing one of the sections holding a semi-charge of ice-cream.

In the preferred form shown by Figures 1 to 5, inclusive, the inner portions of the sections constitute the wall of a central orifice 18 extending through the container, so that a digit inserted in the opening may bear on a portion of each section, as indicated by Figure 2, and thus prevent edgewise displacement of either section relative to the other.

An ice-cream sandwich may be made by inserting a semi-charge 14a (Figure 4) in the recessed side of each section, and then assembling the charged sections to form the sandwich shown by Figure 2.

Figure 6:
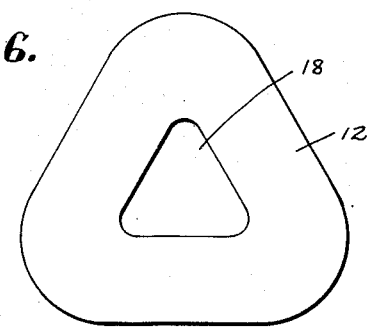
Figure 6 is a view similar to Figure 1, showing a modified form of the container.
Figure 5:
Figure 5 is a sectional view showing container sections nested together.
Figure 7:
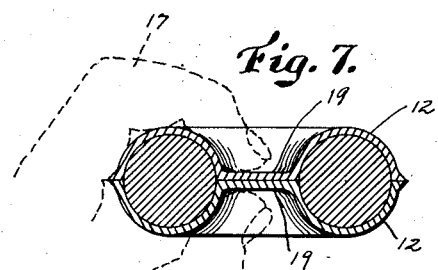
Figures 7 and 8 are views similar to Figure 2, showing modifications.
Figure 8:
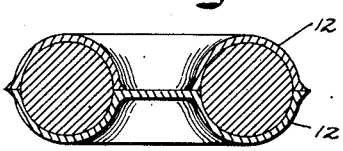

The sections are adapted to be nested as shown by Figure 5, and thus compactly arranged for storage and shipment. I use the term "annular" to convey the idea that the cavity and the charge therein are endless or ringlike. I am not limited, however, to the circular form shown by Figure 1. The sections may have the approximately triangular form shown by Figure 6, or may otherwise depart from a circular form. Each section may be provided with a web 19, extending across the central opening, as shown by Figure 7, the webs forming the bottoms of two deep central recesses in the opposite sides of the container, so that the digit 16 may bear on said bottom, as well as on an inside external face, as indicated by Figure 7, the meeting faces of the webs 19 constituting portions of the abutment faces. Only one of the sections may be provided with said web, the other being formed as shown by Figures 2, 3, 4 and 5.

The abutment faces 15 may have any desired form enabling the faces of each section to closely fit the faces of the other, and form a joint through which ice-cream cannot exude when the sections are confined, as described.

I claim:

1. An edible container composed of two sections having annular recessed internal faces forming an annular charge-holding cavity, abutment faces at opposite sides of the recessed faces, and external faces conforming to the recessed faces and constituting annular inner and outer rests for digits of a holding hand grasping the container, the arrangement being such that said digits may press the abutment faces together, and prevent relative edgewise displacement of the sections and exudation of charge material between said abutment faces.

2. An edible container as specified by claim 1, the inner portions of the sections constituting the wall of a central digit-receiving orifice extending through the container.

In testimony whereof I have affixed my signature.

ELLIOTT M. STORY.